(12) United States Patent
Speier et al.

(10) Patent No.: US 8,352,682 B2
(45) Date of Patent: Jan. 8, 2013

(54) METHODS AND APPARATUS FOR ISSUING MEMORY BARRIER COMMANDS IN A WEAKLY ORDERED STORAGE SYSTEM

(75) Inventors: Thomas Philip Speier, Raleigh, NC (US); James Norris Dieffenderfer, Apex, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 12/471,652

(22) Filed: May 26, 2009

(65) Prior Publication Data

US 2010/0306470 A1 Dec. 2, 2010

(51) Int. Cl.
*G06F 13/00* (2006.01)
(52) U.S. Cl. ...................................... 711/122
(58) Field of Classification Search .................. 711/122
See application file for complete search history.

(56) References Cited

U.S. PATENT DOCUMENTS

| | | | |
|---|---|---|---|
| 5,649,102 A * | 7/1997 | Yamauchi et al. | 709/213 |
| 6,275,913 B1 | 8/2001 | Jeddeloh | |
| 7,774,512 B2 * | 8/2010 | Suzuoki | 710/22 |
| 2006/0026309 A1 * | 2/2006 | Day et al. | 710/22 |
| 2006/0218358 A1 * | 9/2006 | Hofmann et al. | 711/151 |

FOREIGN PATENT DOCUMENTS

| WO | 2008028101 | 3/2008 |
|---|---|---|
| WO | WO2008028101 | 3/2008 |

OTHER PUBLICATIONS

International Search Report—PCT/ US2010/036209, International Search Authority—European Patent Office Oct. 5, 2010.
Written Opinion—PCT/ US2010/036209, International Search Authority—European Patent Office Oct. 5, 2010.
International Search Report and Written Opinion—PCT/US2010/036209, International Search Authority—European Patent Office—Oct. 5, 2010.

* cited by examiner

*Primary Examiner* — Hoai V Ho
*Assistant Examiner* — Min Huang
(74) *Attorney, Agent, or Firm* — Nicholas J. Pauley; Sam Talpalatsky; Jonathan T. Velasco

(57) ABSTRACT

Efficient techniques are described for enforcing order of memory accesses. A memory access request is received from a device which is not configured to generate memory barrier commands. A surrogate barrier is generated in response to the memory access request. A memory access request may be a read request. In the case of a memory write request, the surrogate barrier is generated before the write request is processed. The surrogate barrier may also be generated in response to a memory read request conditional on a preceding write request to the same address as the read request. Coherency is enforced within a hierarchical memory system as if a memory barrier command was received from the device which does not produce memory barrier commands.

22 Claims, 4 Drawing Sheets

METHODS AND APPARATUS FOR ISSUING MEMORY BARRIER COMMANDS IN A WEAKLY ORDERED STORAGE SYSTEM

FIELD OF THE DISCLOSURE

The present disclosure relates generally to processing systems and more particularly, to techniques for maintaining order of program storage operations by issuing memory barrier commands in a weakly ordered storage system.

BACKGROUND

Many portable products, such as cell phones, laptop computers, personal data assistants (PDAs) and the like, utilize a processing system that executes programs, such as, communication and multimedia programs. A processing system for such products may include one or more processors, complex memory systems for storing instructions and data, controllers, and peripheral devices configured to interface with the processors and memory over one or more busses. At the same time, portable products have a limited energy source in the form of batteries that are often required to support high performance operations from the processing system. To increase battery life, it is desired to perform these operations as efficiently as possible. Many personal computers are also being developed with efficient designs to operate at reduced energy consumption.

In such processing systems, the processors often achieve performance benefits by allowing memory operations to be performed out of order. For example, a sequence of memory operations may be reordered to allow those operations to the same page in memory to be executed before a new page is opened. Processing systems that are allowed to reorder memory operations are generally referred to as "weakly ordered" processing systems.

In certain instances, the reordering of memory operations may unpredictably affect program behavior. For example, an application may require a first processor to write a block of data beginning at a first memory address and write a data ready flag to a second memory address indicating the block of data is stored. A second processor is to monitor the data ready flag and when the flag indicates the data has been stored, to read the block of data. In a weakly ordered processing system, there is no guarantee that this order of operations will occur, which may be unacceptable. Also, in a weakly ordered processing system, peripheral devices, in addition to the processors, may operate as bus masters for sending data to and receiving data from memory which may further complicate maintaining order of program storage operations.

Various techniques have been employed for executing ordered memory operations in a weakly ordered processing system. One technique is simply to delay certain memory operations until all memory operations before it are executed. In the previous example, the processor may delay issuing a read request until after it writes to the memory location. Another technique is to use a bus command referred to as a barrier command which is issued when an ordered memory operation is required. The barrier command may be used to ensure that all memory access requests issued by a processor before the barrier command are completed before any memory access requests issued by the processor after the barrier command are executed. Again, in the previous example, a barrier command could be issued by the first processor before writing the data ready flag. This barrier command would ensure that the block of data is written to the memory before the data ready flag is written which ensures the second processor reads the newly stored data.

Some processors, peripheral devices, and bus implementations may not recognize barrier commands. Weakly ordered processing systems that utilize barrier commands would be restricted from using such processors, peripheral devices, and busses. As a consequence, the weakly ordered processing systems may not perform efficiently.

SUMMARY

Among its several aspects, the present disclosure recognizes that providing more efficient methods and apparatuses for issuing memory barrier commands in a weakly ordered storage system may improve performance and reduce power requirements in a processing system. To such ends, an embodiment of the invention addresses a method for enforcing order of memory accesses. A memory access request is received from a device which is not configured to generate memory barrier commands. A surrogate barrier is generated in response to the memory access request.

Another embodiment addresses an apparatus for enforcing order of memory accesses. A bus interface circuit receives a memory access request from a device and communicates the memory access request to a memory hierarchy. A surrogate barrier generator circuit which generates a surrogate barrier in response to the memory access request.

Another embodiment addresses a method for coherency enforcement in a system. A memory access request is received from a device through a bus interface which does not recognize memory barrier commands. A surrogate barrier is generated in response to the memory access request, wherein coherency is enforced within the system as if a memory barrier command was received from the device.

Another embodiment addresses a method for enforcing order of memory accesses. A memory read request is received from a device which is not configured to generate memory barrier commands. Order of memory accesses is enforced in response to the memory read request by withholding read data associated with the memory request until previous memory access operations have been guaranteed to complete.

It is understood that other embodiments of the present invention will become readily apparent to those skilled in the art from the following detailed description, wherein various embodiments of the invention are shown and described by way of illustration. It will be realized that the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
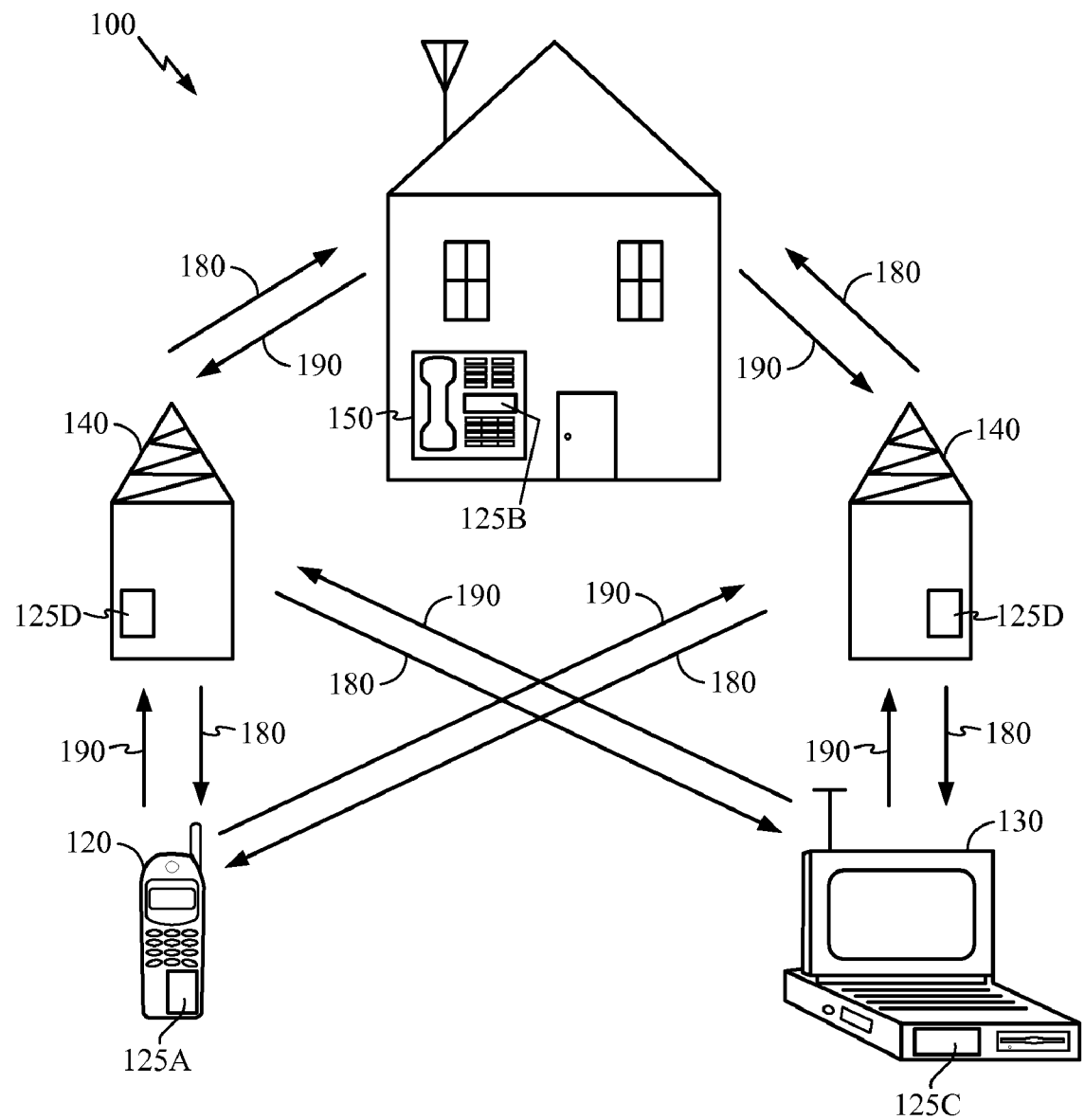
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processing system operating with a weakly ordered storage subsystem.

Figure 2:
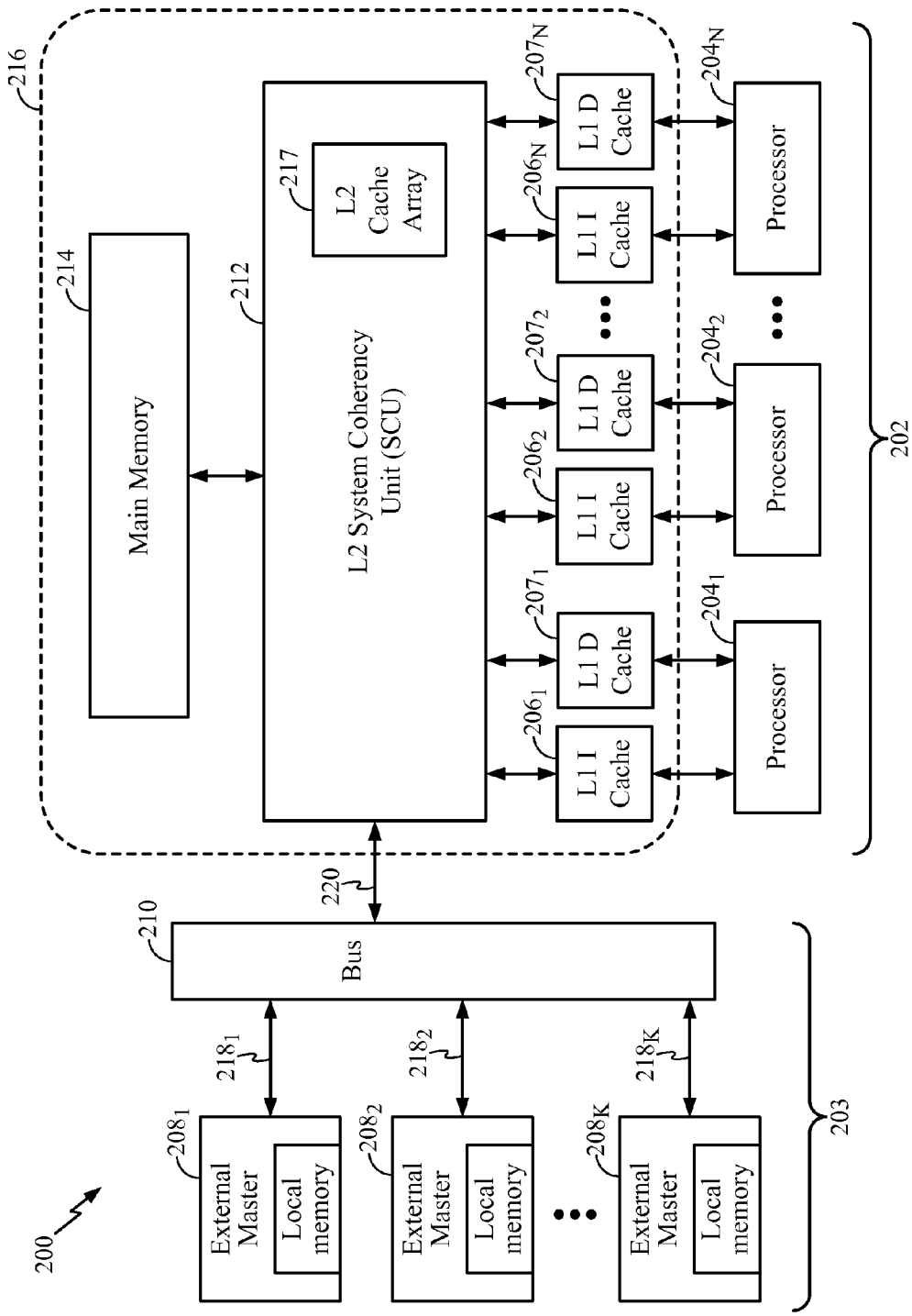
FIG. 2 shows an exemplary processing system supporting devices without barriers in a weakly ordered storage system.

FIG. 2 shows an exemplary processing system 200 supporting devices without barriers in a weakly ordered storage system which may suitably be employed in components 125A, 125C, 125B, and 125D of FIG. 1. The processing system 200 includes system core 202 and external core 203. The system core 202 comprises processors $204_1$, $204_2$, ..., $204_N$, collectively 204, level 1 instruction caches (L1 I-caches) $206_1$, $206_2$, ..., $206_N$, collectively 206, level 1 data caches (L1 D-caches) $207_1$, $207_2$, ..., $207_N$, collectively 207, a level 2 system coherency unit (L2 SCU) 212, and main memory 214. The external core 203 includes external masters (EMs) $208_1$, $208_2$, ..., $208_K$, collectively 208 and a shared bus interconnect 210. The system core 202 includes a memory hierarchy 216 having the L1 I-caches 206, the L1 D-caches 207, the L2 SCU 212 having an L2 cache 217, and the main memory 214. The actual number N of processors 204 and caches 206 and 207 and the number K of EMs 208 required for a particular application may vary depending upon processing requirements and design constraints. Each of the processors 204 and each of the EMs 208 may be implemented as a bus mastering device, such as a general purpose processor, a digital signal processor (DSP), an application specific processor (ASP) or the like. The various components of the processing system 200 may be implemented using application specific integrated circuit (ASIC) technology, field programmable gate array (FPGA) technology, or other programmable logic, discrete gate or transistor logic, or any other available technology suitable for an intended application.

One or more of the processors 204 and one or more of the EMs 208, for example, may be configured to execute instructions under control of a program stored on a computer readable storage medium. For example, a computer readable storage medium may be either directly associated locally with the processors 204 or EMs 208, such as may be available through one of the instruction caches 206, local memory associated with each EM, or accessible to the EMs 208 through the shared bus interconnect 210. The processors 204 may access data from the memory hierarchy 216 in the execution of a program. The EMs 208 also may access data residing in a memory device either directly associated locally with each EM, or accessible through the shared bus interconnect 210 from another processor memory device, for example, the L2 SCU 212. The computer readable storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

In the processing system 200, the L1 D-caches 207 may use write through caching, for example. The L2 system coherency unit (L2 SCU) 212 advantageously ensures proper ordering of memory access operations in the system 200 having bus master devices that are incapable of sending a barrier command. The main memory 214 may consist of a hierarchy of memory devices, such as a level 3 cache, bulk memory, and the like. A write operation to a write through data cache causes the data to also be written to the next level memory.

An external master (EM) may be a memory controller, a bridge device for interconnecting to another bus interconnect device, a peripheral device such as a hard disk controller, a universal serial bus (USB) controller, an interactive display device, a radio device coupling a controller to a transmitter and receiver, or the like. The external masters (EMs) 208 are coupled to the shared bus interconnect 210 by bidirectional interfaces $218_1$, $218_2$, ..., $218_K$ which communicates memory access requests to the memory hierarchy 216 over a shared bus 220. The EMs 208 may also be bus masters that utilize direct memory access (DMA) techniques for reading or writing data to the main memory 214. The shared bus interconnect 210 manages bus traffic and provides connection paths between each of the EMs 208 and memory through the shared bus 220. The shared bus 220 may be configured, for example, with dedicated channels associated with each EM.

In particular, each of the bidirectional interfaces $218_1$, $218_2$, ..., $218_K$ may include write data, address, and read data busses and associated control signals. In many systems, a combined write and read data bus may be used. Generally, the separate address, read data, and write data busses conform to a particular bus architecture, or standard, depending upon the requirements of a particular system. Each of the EMs 208 communicates over their corresponding bidirectional interfaces 218 using, for example, memory access requests. A memory access request may include a write or store request, a read or load request, or bus related requests, which may include memory barrier commands. Not all bus interfaces used by external masters, such as the bidirectional interfaces $218_1$, $218_2$, ..., $218_K$, support or recognize memory barrier commands even if an EM issued one. Also, not all EMs support memory barrier commands. For example, an EM may not be configured, either by implementation or by programming means, to generate memory barrier commands. In any of these cases, without memory barrier command support from an external master, the processors 204 would be unaware of an external master's intention regarding a memory access operation.

A problem scenario is initially described without use of the novel features described herein for the purpose of highlighting one of the problems with maintaining a correct order of memory accesses in a multiprocessor system. In particular, a multiprocessor system, such as processing system 200, is used which does not support broadcasting of barrier commands across a bus that couples an external master to the memory hierarchy. With regard to the processing system 200 of FIG. 2, an example of a problem scenario is based on memory access operations occurring on processor $204_1$, processor $204_2$, and EM $208_2$. The memory access operations are shown in Table 1 ordered by a sequence of operation events.

TABLE 1

| Event | Processor $204_1$ | EM $208_2$ | Processor $204_2$ |
|---|---|---|---|
| 1 | STR-X = 5 | | |
| 2 | | LDR-X = 5 | |
| 3 | | DMB | |
| 4 | | STR-Y = 1 | |
| 5 | | | LDR-Y = 1 |
| 6 | | | LDR-X (dependent, must get 5) |

In this example, locations X and Y in the L2 cache array 217 are initially zero. In a first event, the processor $204_1$ executes a store register (STR) instruction to write a value of 5 to location X. In a second event, the EM $208_2$ issues a load register (LDR) instruction to read a value from address X. The value read is the value 5 previously stored in location X by the STR X instruction during the first event. It is noted that snoop invalidate commands associated with the STR X instruction have not reached the other processors 204, including processor $204_2$ by the second event. Snoop monitoring is a process to monitor bus traffic for writes to the memory system. In this process, a processor determines if out of date shared data is in its local cache. Snoop invalidate commands are issued to a processor if that processor may have an out of date copy of the shared data targeted by the write command. If shared data is found in the local cache, the snoop invalidate command invalidates the copy of the shared data since it would be out of date due to a detected write operation.

In a third event, the EM $208_2$ issues a data memory barrier (DMB) command. The EM $208_2$, as a result of the DMB, waits for all of its own preceding writes to have received a completion response and any preceding reads to have received the associated data. However, the DMB command is not broadcast across the shared bus 220. Since the system core 202 is not aware that the EM $208_2$ issued the DMB command, no ordering constraint is being enforced within the system core 202. Similarly, in those systems having an external master which does not support memory barrier commands, such as a DMB, no ordering constraint would be enforced within the system core 202. Thus, any EM $208_2$ preceding writes would receive a completion response and the preceding read, such as occurred in response to the second event LDR X instruction would receive the data value read of 5.

The fourth event occurs after receiving the data value read in response to EM $208_2$ LDR X instruction and after the completion of the data memory barrier. At the fourth event, the EM $208_2$ issues a store register (STR) instruction to write a value of 1 to location Y. At the fifth event, processor $204_2$ executes a LDR Y instruction to read the value 1 stored there by the EM $208_2$ STR Y instruction. At this point, the DMB command from the third event would have required processor $204_2$ to observe the value of 5 from the result of processor $204_1$'s STR X instruction. However, since the shared bus 220 did not broadcast the DMB command, no ordering constraints have been imposed. For example, a snoop invalidate command associated with the STR X instruction of processor $204_1$ may not have reached processor $204_2$ by the time of the fifth event, which may occur, for example, if the snoop invalidate command was stalled in snoop queuing logic within the L2 SCU 212. Therefore, at the sixth event, processor $204_2$'s LDR X could read an old value stored in its own L1 D cache $207_2$. Thus the ordering constraints implied by the EM $208_2$ issued DMB command have been violated.

To ensure memory operations occur in the correct order in a processing system having a weakly ordered storage system and supporting devices and bus implementations without barriers, the processing system recognizes that when a read request is received from a device through its interface which does not support barrier commands, a surrogate memory barrier is generated by the processing system. For example, the surrogate memory barrier is generated in the L2 SCU 212 which is the point of interface with the external masters 208.

Figure 3:
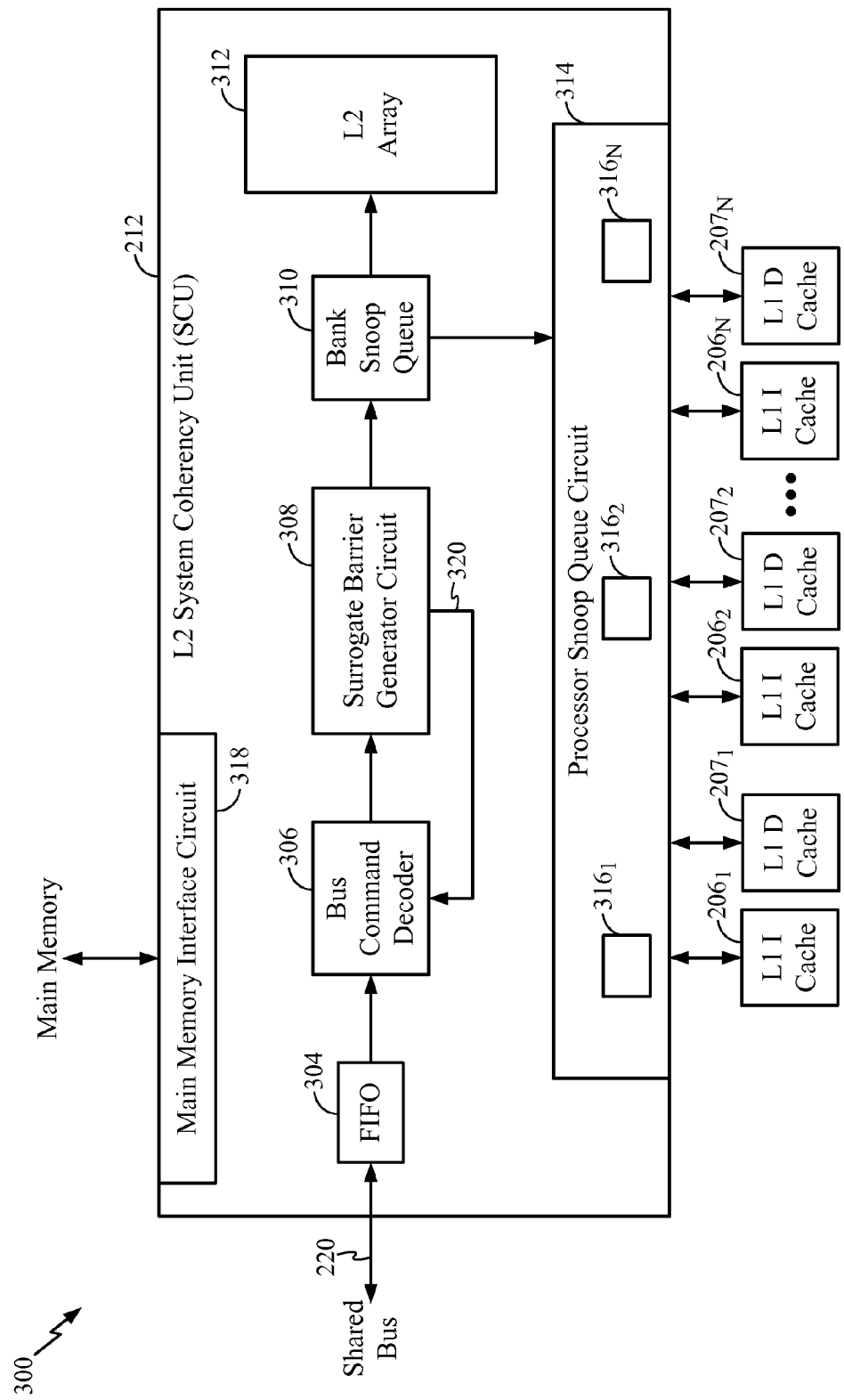
FIG. 3 illustrates an exemplary memory access order control system showing further details of the L2 system coherency unit (L2 SCU) of FIG. 2.

FIG. 3 illustrates an exemplary memory access order control system 300 showing expanded detail of the L2 system coherency unit (L2 SCU) 212 of FIG. 2. The L2 SCU 212 comprises a first in first out (FIFO) buffer 304, a bus command decoder 306, a surrogate barrier generator circuit 308, a bank snoop queue 310, a level 2 (L2) array 312, a processor snoop queue circuit 314, and a main memory interface circuit 318. The shared bus 220 is typically buffered, for example with a FIFO buffer 304, to support flow control and variation in bus traffic between multiple devices. While a single FIFO buffer is shown in FIG. 3, it is realized that a plurality of FIFO buffers may be used depending upon the configuration of the shared bus 220, such as may occur in a multiple channel shared bus design. The bus command decoder 306 decodes bus requests, such as a write or store request, a read or load request, or any other bus related commands.

In the processing system 200, one or more of the EMs 208 and the shared bus 220 do not support memory barrier commands. To resolve memory order violations, such as the scenario illustrated in Table 1 and described above, the surrogate barrier generator circuit 308 generates surrogate memory barrier commands, such as a surrogate read barrier, upon receiving a read request. For example, a surrogate read barrier is generated when the read request caused by the LDR X load instruction issued by EM $208_2$ is received and recognized in the L2 SCU 212. An indicator 320 is set that a read barrier is in progress such that memory access requests that follow the surrogate barrier are held pending until the surrogate barrier is acknowledged complete. The bank snoop queue 310, associated with the L2 array 312, stores a surrogate read barrier that is tagged to identify the EM making the read request. The bank snoop queue 310 is considered a first stage in a snoop queuing process. The L2 array 312 contains banks of memory that may be targeted by bus requests. The processor snoop queue circuit 314 comprises individual processor snoop queues $316_1$, $316_2$, . . . , $316_N$, collectively 316, associated with each of the processors 204 of FIG. 2 and form a second stage in the snoop queuing process.

As an example, the surrogate read barrier is placed into the bank snoop queue 310 associated with the L2 array 312 and communicated to coherency participants, such as processor snoop queues 316 to enforce an ordering constraint. The ordering constraint ensures that results of executing memory accesses issued before the surrogate memory barrier are observable by processors in the processing system, such as processors 204, before any memory accesses issued after the surrogate memory barrier are allowed to execute. The surrogate memory barrier is tagged with the identification reference (ID) of the device making the read request in order to associate an acknowledgement with the appropriate surrogate memory barrier.

In more detail, when a surrogate read barrier is generated, tagged, and placed into the bank snoop queue 310, the surrogate read barrier is also communicated to the individual processor snoop queues $316_1, 316_2, \ldots, 316_N$. The surrogate read barrier in the processor snoop queues 316 forces preceding snoop invalidate commands through the processor snoop queues 316 and into their associated processor to a point at which the snoop invalidate commands are performed on their corresponding L1 D-cache 207. Thus, write operations preceding the read barrier and associated with those snoop invalidate commands are made visible to the processors 204. The preceding snoop invalidate commands may, for example, be associated with store operations that are being observed by one or more external masters, such as the EM $208_2$ that issued the LDR X instruction, which prompted the read barrier to be generated. It is noted that the read barrier ensures that any prior snoop invalidate commands are performed on an L1 D-cache before any new operations access the L1 D-cache.

The LDR X instruction read operation may proceed through the targeted L2 array 312 and return the read data to the external master without waiting on the progress of the surrogate read barrier. If the system core 202 receives a write request from one of the EMs 208 and there are still surrogate read barriers associated with that EM pending in any of the snoop queues of the L2 array 312, that write request is held from executing in the L2 SCU 212 prior to accessing the targeted L2 bank due to the pending surrogate read barrier. In this manner, it is not possible for any of the processors 204 to observe the EM's write request, which may be a post barrier write request, until the surrogate read barriers have completed. Thus, the processors 204 will be guaranteed to have performed the snoop invalidate commands for any writes that the EM may have observed prior to sending the write request. Further, a subsequent write from the EM will stall until it is known that all prior snoop invalidate commands for writes that EM may have observed are completed.

Also, any external master's write request causes a snoop invalidate command to be generated and placed into the bank snoop queue 310 of the targeted bank in the L2 array 312. In a similar manner as described above, the snoop invalidate command flows into the processor snoop queues 316 and then to their associated processor 204. The response to the EM regarding completion of the write request is not sent to the EM until the associated snoop invalidate command has traveled through all of the processor snoop queues 316 and reached the associated processors 204.

In one embodiment, the requirements for surrogate read barriers and snoop invalidate commands described above, generally pertain to those accesses from external masters that are presented as cacheable and sharable. Cacheable and shareable are two attributes used to describe memory targeted by a request. If the memory is not cacheable, then no cache 207 can be caching the target memory location, and, as such, no snoop invalidate commands are required for that memory. Likewise, memory that is not marked as shareable means that the system is not obligated to enforce coherency across any two agents, and, as such, no snoop invalidate commands are required for the memory that is not shared.

An alternative embodiment for controlling an external master is by having the system core 202 withhold the LDR X read data from being sent to the external master, such as at event 2 of Table 1, until the read barrier has completed. The EM will not complete a barrier, such as event 3 of Table 1, until all preceding storage operations have completed, such as event 2 of Table 1. By withholding the LDR X read data from being sent to the external master, the system core 202 guarantees that the snoop invalidate associated with event 1 of Table 1 has traveled through all of the processor snoop queues 316 and reached the associated processors 204. This ensures that the results of STR Y, such as event 4 in Table 1, will not be visible until all snoop invalidates associated with the STR X have completed. The advantage of generating a surrogate barrier post read instead of withholding the read data is that the EM can begin processing the read data sooner which improves the efficiency of the system.

As described above, a surrogate read barrier is generated in response to a read request from an external master. In another embodiment, a surrogate read barrier may be generated in response to a write request from an external master before operating on the write request. Instead of preemptively generating the barrier following the read operation, the L2 SCU 212 waits until it receives a write request and then generates the barrier before the write is performed. The advantage to generating the barrier post read compared to generating the barrier pre-write is that the barrier may have completed before any subsequent writes from an EM are received by 212 improving efficiency of operations. Generating the barrier pre-write may be considered an alternative approach.

In another embodiment, a surrogate read barrier may be generated selectively. For example, the generation of a surrogate barrier may be conditional on one or more preceding write requests to the same address as a read request received from an external master. In the example shown in Table 1, the read barrier is only necessary because the LDR X of event 2 is targeting the same memory location as the STR X of event 1. It is only because LDR X observed the STR X data that a barrier is necessary to ensure that the snoop invalidate associated with STR X has completed. Selectively generating the read barrier based on address comparison between read requests from EM and pending snoop invalidates increases system efficiency because it reduces the number of read barriers generated.

In another embodiment, the generation of a surrogate barrier may be selective to those external masters not having barrier generation capabilities. External masters having barrier generation capabilities would bypass the surrogate barrier generation circuit 308, sending a barrier to the bank snoop queue 310 and also to the processor snoop queue circuit 314. If an external master is capable of generating barriers, then the EM will generate the barrier as needed as opposed to the surrogate barrier generation circuit 308 generating a barrier after every read operation. Since the number of read operations from an EM is typically much larger than the number of actual barriers generated from an EM, selectively generating surrogate read barriers only for EMs that cannot generate barriers increases system efficiency because it reduces the number of read barriers generated.

In a further embodiment, a surrogate read barrier may be generated in a bus interconnect unit, such as the shared bus interconnect 210. The shared bus interconnect 210 would tag the surrogate read barrier to identify the EM making the read request and hold pending any following memory access requests until a read barrier acknowledgement indication is received that the surrogate read barrier is complete.

Figure 4:
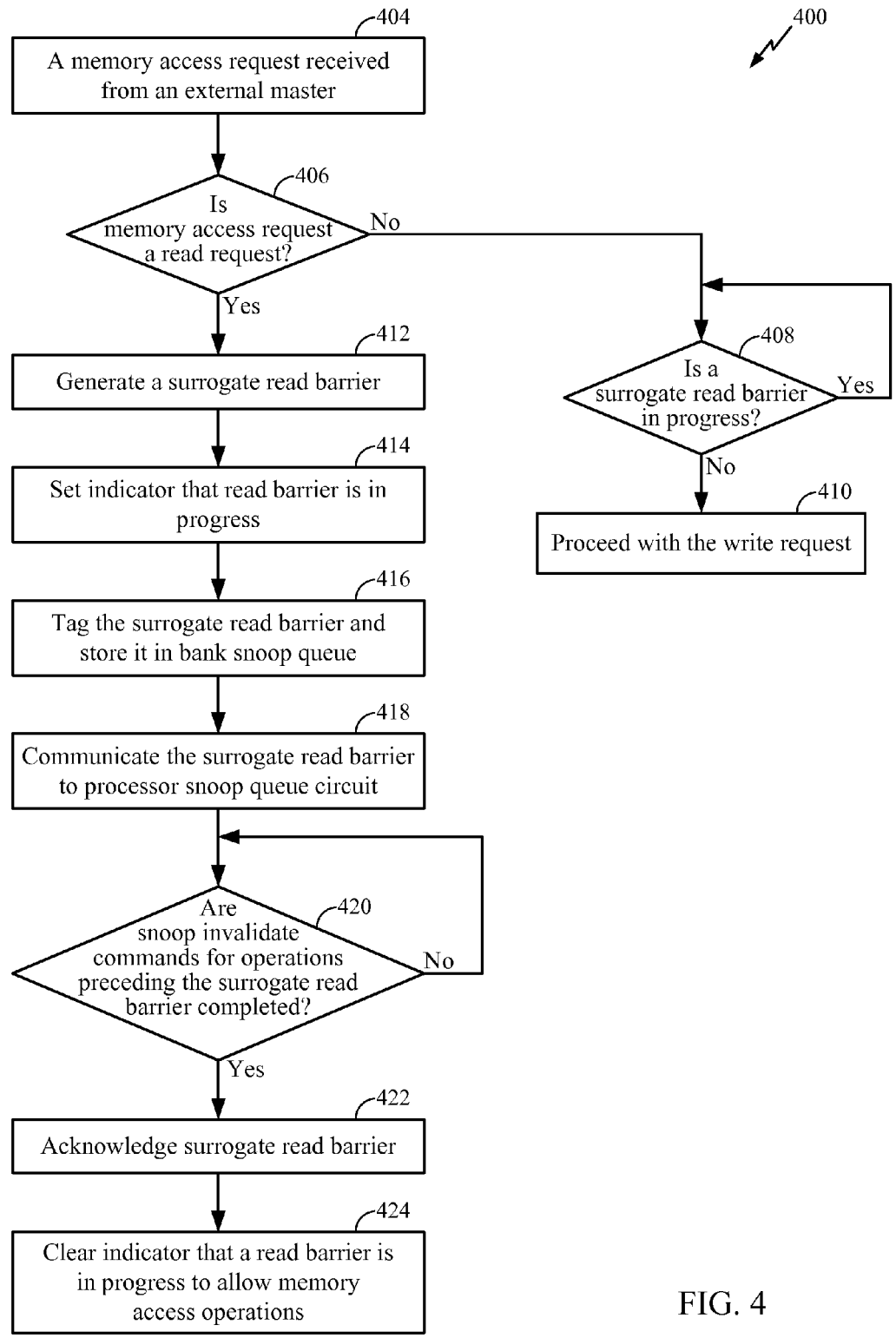
FIG. 4 illustrates an exemplary process for generating a surrogate read barrier for devices without barriers in a weakly ordered storage system.

FIG. 4 illustrates an exemplary process 400 for generating a surrogate read barrier for devices without barriers in a weakly ordered storage system. At block 404, a memory access request is received in the L2 SCU 212 from one of the external masters 208. At decision block 406, a determination is made, for example, in bus command decoder 306 of FIG. 3, whether the memory access request is a read request. If the memory access request is not a read request, it is a write request and the process 400 proceeds to decision block 408. At decision block 408, a further determination is made whether a surrogate read barrier is already in progress, for example, by checking a memory barrier in progress indicator, such as indicator 320 of FIG. 3. If a surrogate read barrier is already in progress, the process 400 waits until the surrogate read barrier has completed and then proceeds to block 410. At block 410, the write request is handled.

Returning to decision block 406, if the memory access request is a read request, the process 400 proceeds to block 412. At block 412, a surrogate read barrier is generated in surrogate barrier generator circuit 308 in response to receiving the read request. At block 414, an indicator, such as the indicator 320, is set to indicate that a read barrier is in progress. At block 416, the surrogate read barrier is tagged to identify the EM making the read request and stored in a queue, such as the bank snoop queue 310. At block 418, the surrogate read barrier is communicated to the processors 204, via queues, such as the processor snoop queues 316. At decision block 420, a determination is made in processor snoop queue circuit 314, for example, whether snoop invalidate commands for operations preceding the surrogate read barrier are completed. If any snoop invalidate commands are pending, the process 400 waits until they are complete. When the snoop invalidate commands are completed, the process 400 proceeds to block 422. At block 422, the surrogate read barrier is acknowledged. At block 424, the indicator previously set at block 414 is cleared and memory access operations are allowed to be processed.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, a special purpose controller, or a micro-coded controller. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of illustrative embodiments for use in processor systems it will be recognized that a wide variety of implementations may be employed by persons of ordinary skill in the art consistent with the above discussion and the claims which follow below. For example, fixed function implementations may also utilize various embodiments of the present invention.

What is claimed is:

1. A method for enforcing order of memory accesses, the method comprising: receiving a memory access request from a device which is not configured to
    generate memory barrier commands; and
    generating a surrogate barrier in response to the memory access request wherein the surrogate barrier is generated by a level two cache coherency control interference circuit.

2. The method of claim 1, wherein the interface circuit is configured to enforce the order of memory access requests from the device by having bus master devices that are incapable of sending a barrier command.

3. The method of claim 2, wherein the interface circuit is a bus interface circuit coupled to the device, the plurality of processors, and to the memory.

4. The method of claim 2, wherein the interface circuit is coupled to the device, to a plurality of caches associated with the plurality of processors, and to a main memory.

5. The method of claim 1, wherein the memory access request is a read request.

6. The method of claim 5, wherein the surrogate barrier is conditionally generated based on one or more preceding write requests to the same address as the read request.

7. The method of claim 1, wherein the surrogate barrier not generated in response to a memory access request from a device that has memory barrier generation capabilities.

8. The method of claim 1, wherein the memory access request is a write request and the surrogate barrier is generated before the write request is processed.

9. The method of claim 2, wherein the interface circuit is a bus interface unit coupled to a plurality of devices some of which do not produce memory barrier commands.

10. The method of claim 1 further comprising:
    broadcasting the surrogate barrier to all coherency participants.

11. An apparatus for enforcing order of memory accesses, the apparatus comprising:
    a bus interface circuit that receives a memory access request from a device and communicates the memory access request to a memory hierarchy;
    a surrogate barrier generator circuit which generates a surrogate barrier in response to the memory access request; and
    a bank snoop queue for ordering the memory requests and barriers associated with one or more banks of the memory.

12. The apparatus of claim 11, wherein the bus interface circuit does not support memory barrier commands.

13. The apparatus of claim 11, wherein the decoded memory access request is a read request.

14. The apparatus of claim 11, wherein the decoded memory access request is a write request and the surrogate barrier is generated before the write request is processed.

15. The apparatus of claim 11 further comprises:
a processor snoop queue circuit having a snoop queue associated with each of the plurality of processors, the snoop queue for ordering the memory requests and barriers.

16. A method for coherency enforcement in a system, the method comprising:
receiving a memory access request from a device through a bus interface which does not recognize memory barrier commands; and
generating a surrogate barrier in response to the memory access request, wherein coherency is enforced within the system as if a memory barrier command was received from the device.

17. The method of claim 16, wherein the memory access request is a read request.

18. The method of claim 16, wherein the memory access request is a write request and the surrogate barrier is generated before the write is processed.

19. The method of claim 16, wherein the generation of the surrogate barrier is conditional on a preceding write request to the same address as the read request.

20. The method of claim 16 further comprising:
delaying subsequent write requests from being processed until an acknowledgement is received indicating the surrogate barrier has completed.

21. The method of claim 16 further comprising:
broadcasting the surrogate barrier to all coherency participants.

22. A method for enforcing order of memory accesses, the method comprising:
receiving a memory read request from a device which is not configured to generate memory barrier commands; and
enforcing order of memory accesses in response to the memory read request by withholding read data associated with the memory read request until previous memory access operations have been guaranteed to complete.

* * * * *

UNITED STATES PATENT AND TRADEMARK OFFICE
CERTIFICATE OF CORRECTION

PATENT NO. : 8,352,682 B2
APPLICATION NO. : 12/471652
DATED : January 8, 2013
INVENTOR(S) : Thomas Philip Speier, James Norris Dieffenderfer and Thomas Andrew Sartorius It is certified that error appears in the above-identified patent and that said Letters Patent is hereby corrected as shown below:

In the Claims

Column 10, line 12, cancel the text beginning with "1. A method for enforcing order" extending to and ending with "control interference circuit." in column 10, line 18, and insert the following claim:

--1. A method for enforcing order of memory accesses, the method comprising: receiving a memory access request from a device which is not configured to generate memory barrier commands; and generating a surrogate barrier in response to the memory access request wherein the surrogate barrier is generated by a level two cache coherency control interface circuit.--

Column 10, line 37, cancel the text beginning with "7. The method of claim 1, wherein the surrogate barrier" extending to and ending with "barrier generation capacities." in column 10, line 39, and insert the following claim:

--7. The method of claim 1, wherein the surrogate barrier is not generated in response to a memory access request from a device that has memory barrier generation capabilities.--

Column 10, line 49, cancel the text beginning with "11. An apparatus for enforcing order" extending to and ending with "banks of the memory." in column 10, line 60, and insert the following claim:

--11. An apparatus for enforcing order of memory accesses, the apparatus comprising: a bus interface circuit that receives a memory access request from a device and communicates the memory access request to a memory hierarchy; a surrogate barrier generator circuit which generates a surrogate barrier in response to the memory access request; and a bank snoop queue for ordering the memory requests and surrogate barriers associated with one or more banks of the memory.--

Column 11, line 1, cancel the text beginning with "15. The apparatus of claim 11" extending to and ending with "requests and barriers." in column 11, line 5, and insert the following claim:

Signed and Sealed this
Thirteenth Day of August, 2013

Teresa Stanek Rea
*Acting Director of the United States Patent and Trademark Office*

--15. The apparatus of claim 11, further comprising: a processor snoop queue circuit having a snoop queue associated with each of a plurality of processors, the snoop queue for ordering the memory requests and surrogate barriers.--

Column 12, line 1, cancel the text beginning with "19. The method of claim 16" extending to and ending with "as the read request." in column 12, line 3, and insert the following claim:

--19. The method of claim 16, wherein the generation of the surrogate barrier is conditional on a preceding write request to the same address as a read request.--